United States Patent [19]
Rader

[11] Patent Number: 6,116,101
[45] Date of Patent: Sep. 12, 2000

[54] METHOD AND APPARATUS FOR DETERMINING THE INTERMATEABILITY OF CONNECTOR ASSEMBLIES

[75] Inventor: Dean Rader, Montclair, N.J.

[73] Assignee: Telcordia Technologies, Inc., Morristown, N.J.

[21] Appl. No.: 09/097,879

[22] Filed: Jun. 15, 1998

Related U.S. Application Data

[60] Provisional application No. 60/051,607, Jul. 2, 1997.

[51] Int. Cl.[7] .................................................. G01R 27/00
[52] U.S. Cl. .......................................... 73/865.9; 327/699
[58] Field of Search ..................................... 324/699, 697, 324/716; 73/865.8, 865.9, 788, 806

[56] References Cited

U.S. PATENT DOCUMENTS

| | | | |
|---|---|---|---|
| 3,417,323 | 12/1968 | Williamson | 324/699 |
| 4,797,604 | 1/1989 | Rocci et al. | 324/699 |
| 5,057,781 | 10/1991 | Atkins et al. | 324/699 |
| 5,508,621 | 4/1996 | Wong | 324/718 |
| 5,811,979 | 9/1998 | Rhein | 324/713 |

OTHER PUBLICATIONS

TIA/EIA Standard, FOCIS–2, Fiber Optic Connector Intermateability Standard, TIA/EIA–604–2, Nov. 1997, Section 2.2, pp. 3–4 and Section 3, pp. 5–6.

TIA/EIA Standard, FOCIS–3, Fiber Optic Connector Intermateability Standard, TIA/EIA–604–3, Aug. 1997, Section 2.2, pp. 3–4 and Section 3, pp. 5–6.

TIA/EIA Standard, FOCIS–4, Fiber Optic Connector Intermateability Standard, TIA/IEA–604–4, Aug. 1997, Section 2.2, pp. 3–4 and Section 3, pp. 5–6.

International Electrotechnical Commission, IEC 1330–3–22: Fibre optic interconnecting devices and passive components–Basic test and measurement procedures—Part 3–22: Examinations and measurements–Ferrule compression force, 1997.

*Primary Examiner*—Hezron Williams
*Assistant Examiner*—Nashmiya Fayyaz
*Attorney, Agent, or Firm*—Orville R. Cockings; Joseph Giordano

[57] ABSTRACT

Method and apparatus for measuring both the contact force and ferrule length of a fiber optic connector and for measuring the length of an adapter versus the requirements of the TIA/EIA's specifications so that connector intermateability may be determined. The contact force and ferrule length measurement apparatus includes an adapter for holding the connector being tested in place, a gauge pin for detecting the spring force of the connector, a gauge force meter for measuring the force exerting on the gauge pin, and a micropositioner for aligning the gauge pin with the ferrule of the connector. Once the gauge pin and connector are aligned, the spring force is measured based on displacement of the position of the ferrule. The adapter length measurement apparatus includes two sets of test reference connector plugs, each electrically connected at one end to an ohmmeter, so as to form an electrical circuit. Adapter length measurements are made by inserting the free end of first one set and then the other set of each test connector plug into the adapter under test and then measuring the resistance on the ohmmeter. A high resistance with the set of longer reference plugs indicates the adapter is too long. Conversely, a low resistance with the set of shorter reference plugs indicates the adapter is too short.

11 Claims, 3 Drawing Sheets

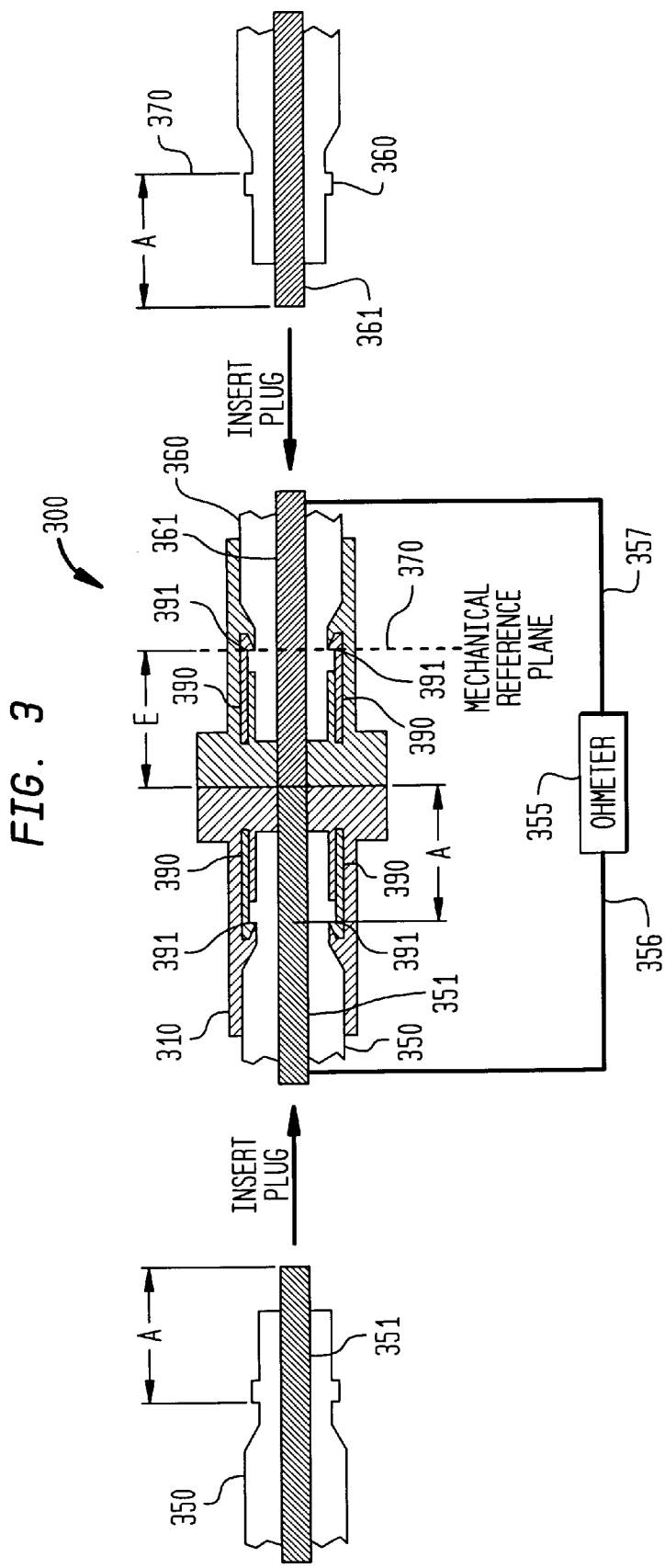

METHOD AND APPARATUS FOR DETERMINING THE INTERMATEABILITY OF CONNECTOR ASSEMBLIES

RELATED APPLICATIONS

This application claims the benefit of U.S. Provisional Application No. 60/051,607 filed on Jul. 2, 1997 and entitled "Ferrule Extension and Contact Force of a Connector."

BACKGROUND OF THE INVENTION

1. Field of the Invention

This invention relates to fiber optic connectors and specifically to testing the intermateability of fiber optic connectors.

2. Background Information

Fiber optic connectors are devices that transfer optical power between optical fibers but which need to be connected and disconnected repeatedly. Fiber optic connectors are connected by mating a connector plug with an adapter to form a connector assembly. In other words, a connector assembly is formed when two connector plugs are inserted into the opposite ends of an adapter. The connector plug is the male member of the connector assembly and is mounted onto the end of the optical fiber. The adapter is the female member of the connector assembly. Since the advent of fiber optics several different types of connectors have been designed and made commercially available. These different connector types are identified by their commercial designation and include those commercially designated as Biconic, FC, and SC. If the two plugs of a connector assembly are of the same type then both ends of the adapter are of same type or commercial designation. On the other hand, hybrid adapters having different openings for different connector types are available and are used to intermate different connector plug types.

Critical to the design of any fiber optic connector is the ability of the connector to provide minimal loss and reflection when mated or connected to another connector of the same type. In order to minimize the loss and reflection of a connection, the Telecommunications Industries Association/ Electronic Industries Association (TIA/EIA), along with other national standard bodies, has promulgated design specifications for each type of plug and adapter. These specifications place limits on various physical plug and adapter parameters so as to achieve a prespecified or common level of performance. These physical parameter limits include, but are not limited to, the connector plug ferrule diameter tolerance, the inside diameter of the connector adapter sleeve and the contact angle of the connector plug.

As with any design specification, parameters are specified with tolerance margins that, if met, should provide the prespecified level of performance. Of course, when any item is mass produced, such as connectors, some are bound to fall outside the tolerance margins. Furthermore, in the case of fiber optic connectors, not only is intermateability performance required among connectors from the same supplier or manufacturer, but connectors are often mated among different suppliers. In fact, fiber optic connectors are regarded as off shelf items throughout the fiber optic industry and are expected to intermate and meet the prespecified levels of performance without regard to manufacturer. As such, there is a need to test connectors against industry standards to gather information on performance and reliability. In fact, fiber optic connector suppliers, as part of their quality control program, normally test fiber optic connectors so as to compile reliability data on their manufacturing operation. Purchasers of fiber optic connectors also maintain quality programs, such as testing samples of the connectors against various industry standards, so as to obtain data on the performance of the connectors that are employed in the purchaser's products or network facilities.

TIA/EIA has documented a series of intermateability standards as part of its TIA/EIA 604 "Fiber Optic Intermateability Standards (FOCIS)". Of particular import to this invention is TIA/EIA's documents 604-2, so called FOCIS-2, 604-3, FOCIS-3, and 604-4, FOCIS-4. FOCIS-2 is directed to connectors with the bayonet Fiber Optic Connectors (BFOC/2.5) commercial designation. FOCIS-3 and FOCIS-4 are directed to connectors with the SC and FC commercial designations, respectively. The, FOCIS-2, FOCIS-3, and FOCIS-4 documents specify requirements that, if met, should ensure that any combination (including hybrids) of each type of connector will mechanically intermate and will meet a common level of performance. In a nutshell, the FOCIS-2/3/4 documents require plugs and adapters with the same commercial designation to intermate while meeting prespecified levels of performance. Specifically, section 2.2 of the FOCIS-2/3/4 documents defines the adapter standard and section 3 defines the plug standards.

Among the plug intermateability requirements is a requirement on the distance the connector plug ferrule is allowed to travel relative to the body of the plug in response to a contact force exerted against the ferrule. These requirements are referred to in the art as the ferrule extension and contact force requirements. The connector plug ferrule is a mechanical fixture, generally a rigid tube, used to confine the stripped end of an optical fiber or cable. The movement of the ferrule is normally restricted by use of a spring and therefore the requirements are directed to both the amount of force required to displace the ferrule spring a certain distance and the normal rest length of the ferrule. A ferrule spring loading force, F, is specified for different distances, A, where A is defined as the distance of the mechanical reference plane of a connector plug-adapter assembly to the tip of the connector plug ferrule. FIG. 1A illustratively depicts the relationship of F and A for a connector plug 11 having a ferrule 12. For example, if no force, i.e., F=0, is exerted on the ferrule then the spring is expected to extend the ferrule its farthest distance, i.e., the normal rest length or no contact force length of the ferrule. As such, the rest length of an SC type connector ferrule is required to be greater than or equal to 7.15 mm, whereas for an FC type connector ferrule the rest length is required be greater than or equal to 3.8 mm. The full relationship, as given by the TIA/EIA, between A and F is given in Tables I and II below for SC and FC connector types, respectively, where A is measured from a reference plane 13 to the tip of ferrule 12. The requirements on other connectors are contained in other FOCIS documents.

TABLE I

EIA/TIA SC Type
Ferrule Travel and Contact Force
Requirements

| IF | THEN |
|---|---|
| F = 0 | A ≧ 7.15 mm |
| A ≦ 7.1 mm | F ≧ 7.8 Newtons (N) |
| A ≧ 6.9 mm | F ≦ 11.8 N |

TABLE II

EIA/TIA FC Type
Ferrule Travel and Contact Force
Requirements

| IF | THEN |
|---|---|
| F = 0 | A ≥ 3.8 mm |
| A ≤ 3.7 mm | F ≥ 7.8 N |
| A ≥ 3.6 mm | F ≤ 11.8 N |

Apparatus to measure the spring loaded force applied to a ferrule when fiber optic connector plugs are mated with each other has been proposed by the International Electrotechnical Commission (Document Title "IEC 1330-3-22: Fibre Optic interconnecting devices and passive components—Basic test and measurement procedures", final draft submitted Nov. 1, 1996). However, in order to assure the intermateability of fiber optic connectors, particularly from different manufacturers, I have found that another critical adapter dimension requirement is the adapter length. The adapter length, E, is defined as the distance from one mechanical plane 17 to the midpoint 18 between the two mechanical reference planes 17, 19 of a simplex adapter 310 as illustratively shown in FIG. 1B. For an SC type connector the adapter length, E, is specified as 6.9 millimeter (mm) ≦E≦7.1 mm. For a FC type connector E is specified as 3.6 mm≦E≦3.7 mm.

The adapter length and the ferrule extension and contact force requirements are directed to the intermateability between adapters and plugs of the same commercial designation. For example, if the adapter length is longer than required, then the ferrules of two intermated plugs will not be close enough to each other in the connector assembly to meet performance requirements. Thus, apparatuses and methods are needed that can be used to test the adapter length in addition to the ferrule extension and contact force of a connector against the requirements given in TIA/EIA documents FOCIS-3 and FOCIS-4 so as to ensure intermateability.

SUMMARY OF THE INVENTION

It is an object of our invention to test the adapter length of a fiber optic adapter, and particularly to perform such a test after measuring the ferrule extension and contact force of the fiber optic connector. In accordance with of my invention connector plugs are machined to the exact minimum and maximum lengths of an adapter. These plugs are connected by leads to an ohmmeter so that when the plugs are inserted into an adapter under test a determination of whether the adapter length meets industry specifications can be determined. This apparatus provides a simple and convenient way by which adapter length measurements can be made. This apparatus may be implemented in a compact lightweight hand held device that would be advantageous for field use. Conversely, the apparatus can be assembled in a laboratory by using a commercially available ohmmeter and by machining test plugs, as we have done.

In accordance with my invention I use the readings on an ohmmeter to determine whether a connector assembly forms a closed circuit. The ohmmeter having leads connected to two test connector plugs is used to measure the length of an adapter, E, by placing the plugs into an adapter under test. If the connector assembly forms a closed circuit, thereby giving a low resistance reading on the ohmmeter, then the adapter being tested is within TIA/EIA specifications. Otherwise, the connector assembly forms an open circuit with a resultant high resistance reading on the ohmmeter.

In accordance with my invention, connectors are first tested in a method procedure against the TIA/EIA's connector ferrule extension and contact force requirements and then, the length of adapters are measured in a second method procedure for conformance to TIA/EIA requirements. Accordingly, by utilizing both method procedures the intermateability of the connector assembly may be determined among different suppliers and among different connector commercial designations.

BRIEF DESCRIPTION OF THE DRAWINGS

These and other advantageous features of our invention can be understood from the following detailed description together with the accompanying drawings, in which:

FIG. 3. depicts an illustrative embodiment of an apparatus of our invention for measuring the length of a fiber optic adapter.

DETAILED DESCRIPTION

Figure 1A:
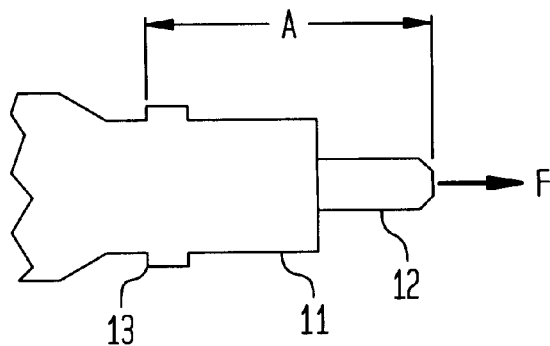
FIG. 1A illustratively depicts the distance, A, a ferrule may move in the presence of a spring loaded force F for a fiber optic connector.
Figure 1B:
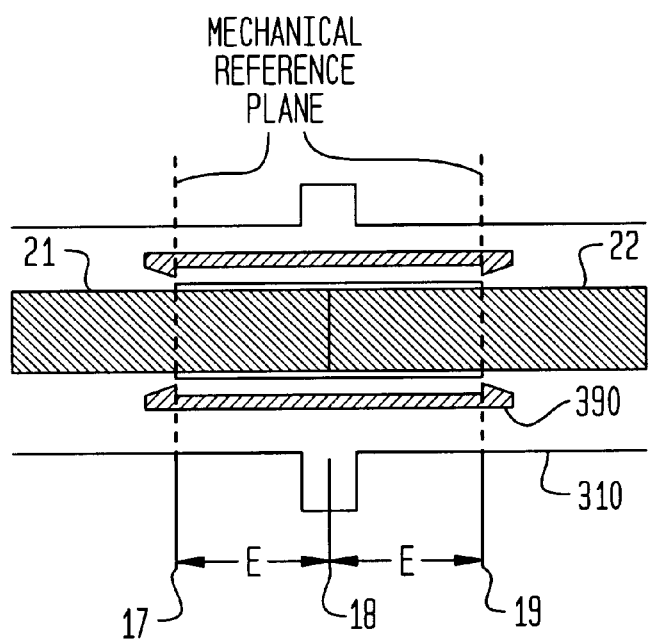
FIG. 1B illustratively depicts the adapter length E of an SC type connector.
Figure 2A:
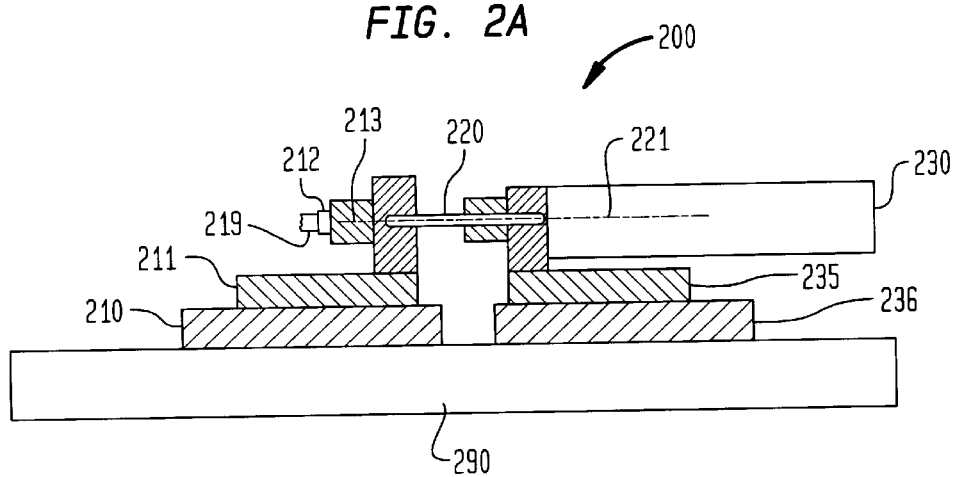
FIG. 2A depicts a side elevation of an illustrative embodiment of an apparatus for measuring the ferrule extension and contact force of a fiber optic connector.
Figure 2B:
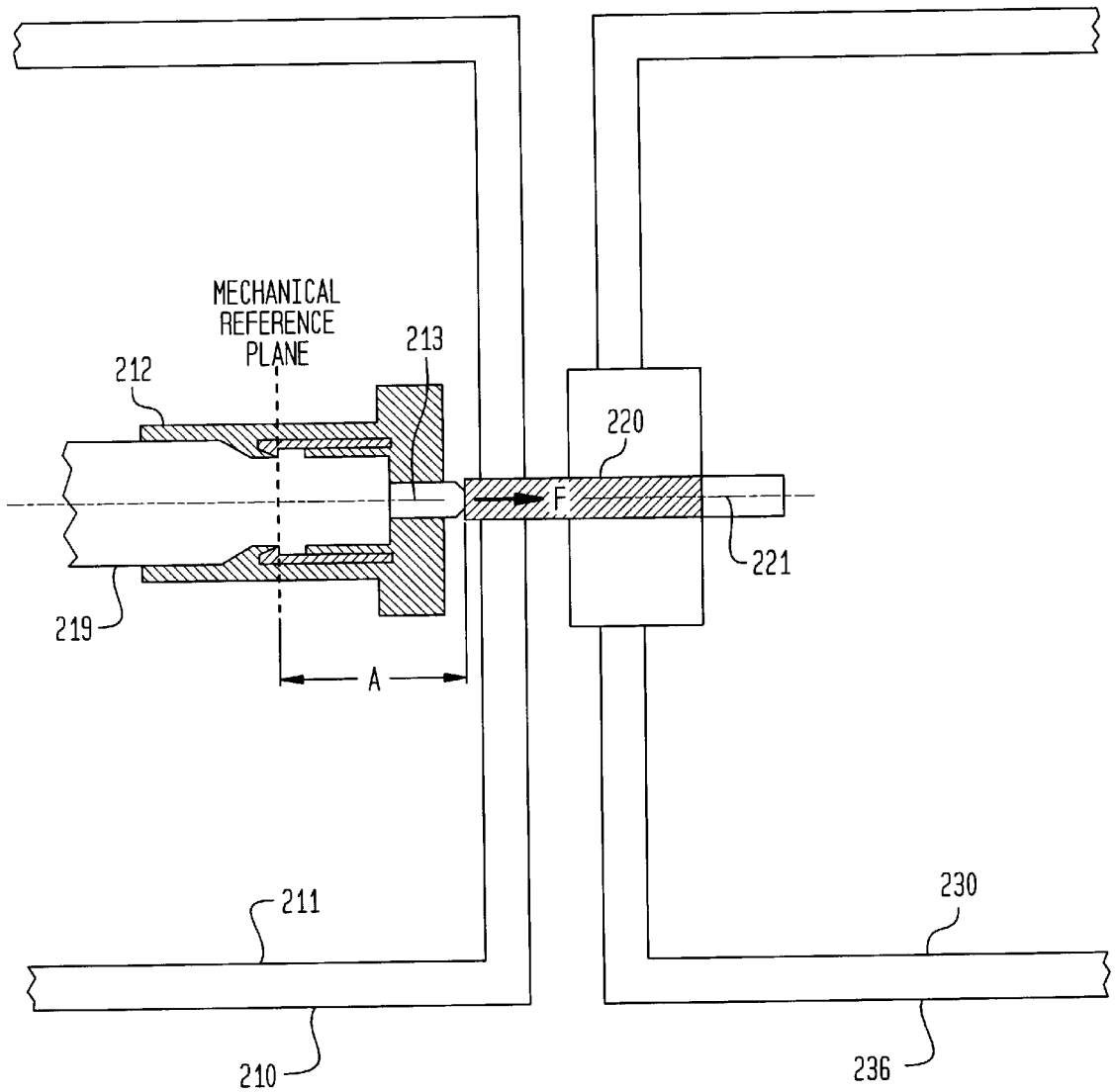
FIG. 2B depicts a top view of the apparatus depicted in FIG. 2A.

Turning now to FIG. 2A and FIG. 2B, there are depicted two views of an illustrative embodiment of an apparatus 200 for measuring the ferrule extension and contact force of a fiber optic connector. On a base 290 is mounted a first micropositioner 210 which is used for positioning a connector plug 219 under test. Mounted onto micropositioner 210 is an adapter mount 211. The adapter mount 211 is used to hold a reference adapter 212. Reference adapter 212 is an adapter into which connector plugs 219 are inserted for testing. A gauge pin 220 is positioned across from reference adapter 212 so that the center axis 221 of the gauge pin 220 is approximately aligned with the center axis 213 of the reference adapter 211. Gauge pin 220 is connected to a force gauge 230. Gauge pin 220 makes contact with the ferrule of the connector plug 219 under test so that force gauge 230 may record the contact force exerted by the ferrule of the connector 219 under test for a given distance. Force gauge 230 is mounted on a force gauge mount 235. Force gauge mount 235 is mounted on a second micropositioner 236 which can be used to aligned the gauge pin 230 with the connector plug 219 under test. Micropostioner 236 is attached to the base 290.

Ferrule extension and contact force measurements require measurement of distances much less than 0.3 mm. Therefore, the apparatus 200 must be precise and stable enough to align and maintain the position of the ferrule of the connector plug 219 in relation to the gauge pin 220 and vice versa. The base 290 provides a first level of stability and is advantageously made of a material such that the first micropositioner 210 and the second micropositioner 236 can be locked in place. In a model I built, the base 290 was made of steel into which holes were drilled so that micropositioners 210 and 236 could be stably locked into place. At other times I have found it convenient to use a Newport optical workbench as the base 290. As is known in the art, Newport optical workbenches are highly stable workbenches with screw holes bored through the work surface; these screw holes are of a standard size and are spaced so that commercially available micropositioners, such as 210 and 236, may be locked into place.

Although a Newport optical workbench may be conveniently used as a base when making laboratory measurements, I do not consider such a workbench suitable for use when making field measurements. A portable field device made in accordance with this aspect of my invention would only require a base rigid enough to reliably lock or hold the micropositioners 210 and 236 in place. Such a base may be made of steel or some other material onto which a micropositioner may be mounted. The important consideration for a field device or test set is that a micropositioner, once mounted onto the base, would be held in place despite being subject to vibrations and shock as might be caused by the test set being dropped.

Micropositioners 210 and 236 are commercially available devices having the capability of adjusting the horizontal and vertical position of adapter 212, the force gauge 230, and consequently the gauge pin 220, with the precision necessary for making measurements in accordance with this aspect of our invention; the vertical and horizontal adjustments are necessary for aligning the adapter 212 with the gauge pin 220, and vice versa. I must note that while micropositioner 210 may be helpful, particularly in the laboratory, in providing an additional means for adjusting the adapter 212, and consequently the connector plug 219, I have found that it can be eliminated. In fact, in our laboratory model we have found it useful to fully restrict the movement of micropositioner 210 by use of a clamp (not shown). On other occasions I have also advantageously eliminated micropositioner 210 by machining an adapter mount 211 that approximately positions the adapter 212 so that micropositioner 236 can be used to make all the alignments necessary to make a measurement. In fact, I do not envision the use of micropositioner 210 in a field device or test set. A field device or test set made in accordance with this aspect of my invention would require only one micropositioner for aligning a gauge pin with the ferrule of the connector plug to be tested wherein the alignment is accomplished entirely by movement of the gauge pin. Thus, a field device requires only one micropositioner for positioning a gauge pin.

In a field device, exact alignment of the ferrule with the gauge pin can be accomplished with precision by measuring the reflectance off the end of a reference plug or the connector 219 or by measuring the electrical connectivity across a electrical circuit formed by the connector 219 and the adapter 212. With respect to alignment by using a reflectance measurement, it is known in the art that when a fiber is in contact with air the back reflectance from the end face of the fiber is approximately −14.7 dB. Thus, when gauge pin 220 makes physical contact with a reference plug the back reflectance will be significantly lower than −14.7 dB. Using the electrical connectivity as a means for aligning the ferrule of the connector 219 and the gauge pin 220 is discussed below in another aspect of our invention. By these methods, a field device could be aligned without human intervention. I note that in my laboratory measurements I determine alignment by using the force meter. That is, when the force meter registers an initial force we readjust the micropositioner 210 or 236 by "backing away" the gauge pin 220 from a reference plug. A similar method may also be implemented in a field device.

Adapter mount 211 is needed to hold adapter 212 in place. Adapter 212 is a commercial available adapter matching the commercial designation of the connector plug to be tested. The connector plug 219 under test is inserted in adapter 212. Thus, the opening of adapter 212 into which the connector 219 is inserted must be of the same commercial designation as the connector 219. In a field test set implemented in accordance with this aspect of our invention an adapter mount, such as 212, could be part of the enclosure of the test set. As discussed above, generally in making a measurement, in accordance with this aspect of our invention, it's the position of the gauge pin 220 with respect to mechanical reference plane that is of importance; in other words, it's the movement of the gauge pin 220 relative to the connector 219, and vice versa, that really matters. As such, in a field test set, the adapter 212 would be placed in an opening in the enclosure of the test set that was approximately aligned with the gauge pin 220. The gauge pin 220, being free to move, could then be adjusted and aligned with the precision necessary by using optical reflection off the ferrule of the connector 219 under test as part of an initial calibration step. Of course, as previously discussed, other means may be used to precisely align the gauge pin in a test set for measurement.

In our measurements I have created calibration reference plugs which fit into adapter 212 for use as part of the initial calibration step. The reference connector plugs are different from commercially available connector plugs in that the ferrule is rigid, i.e., the ferrule is not connected to a spring. Furthermore, the reference connector plugs are either the maximum or minimum lengths allowed by TIA/EIA specifications. For example, I have created two SC reference plugs, one where the distance from the reference mechanical plane to the tip of the ferrule, i.e., A, is 7.1 mm and one where A is 6.9 mm. In making a measurement, a reference plug is first inserted into the adapter 212. The gauge pin 220 is positioned so as to make contact with the reference plug as part of the initial calibration. The reference plug is then removed once the gauge pin 220 position is calibrated. The connector plug under test is then inserted into the adapter 212 and the force is measured for A equal to 6.9, 7.1, and 7.15 mm. A pass/fail determination can then be made from the measurement results.

Force gauge 230 may be any commercially available device used to measure the force exerted on gauge pin 220. In my model apparatus I have used a commercially available force gauge meter with the gauge pin 220 being a cylindrical steel rod small enough to fit into the opening of adapter 212 and a opening in the force gauge 230. For a field portable device I envision a much smaller apparatus than our model. Thus, while I have made manual adjustments to make measurements, I expect such a device to include logic that would perform all the steps necessary to make a measurement. Such a device would then be able to display the results of the measurements to an operator.

Turning now to FIG. 3 there is depicted an illustrative embodiment of an apparatus 300 used in accordance with my invention for measuring the length of an adapter. The apparatus 300 comprises two sets of calibration reference plugs 350 and 360 and an ohmmeter 355 coupled to each reference plug of a set by leads 356 and 357 so as to form an electrical circuit. Each reference plug is machined to a precise value of A as measured from reference plane 370. For example, for an SC connector, calibration reference plugs 350 and 360 were machined for a value of A equal to 7.1 mm for one set and to 6.9 mm for a second set. In measuring the length of an adapter 310 under test the two reference plugs 350 and 360 are inserted into each end of the adapter under test 310. When the two reference plugs 350 and 360 of a set are inserted into adapter 310, the electrical circuit forms a closed electric loop if the ferrules 351 and 361 of the plugs make contact, or an open circuit if the ferrules 351 and 361 of the plugs do not make contact. When two reference plugs having the same A are inserted into the test adapter 310, the length of the adapter, E, relative to A can be determined. If E is greater than A, the plugs will not be in contact and the resistance measured by ohmmeter 355 will be very large, indicating an open circuit. If the adapter length E is smaller than A, either both plugs will not be able to latch within the adapter or the plug tips will compress enough to allow the plugs to be in contact with each other. When the plugs touch the resistance will be very small, on the order of 10Ω or less, indicating a closed circuit. Specifically, my method of using apparatus 300 includes:

Condition #1: (E<7.1 mm) Two reference plugs of a first set, both with A=7.1 mm, are inserted into the adapter under test 310. If the resistance measured is large then the reference plugs are not in contact and therefore the adapter is too long.

Condition #2: (E>6.9 mm) Two reference plugs of the second set, both with A=6.9 mm, are inserted into the adapter under test 310. If the resistance across them is small, on the order of 10Ω, then the reference plugs are in contact and the adapter is too short.

If the adapter is not within TIA/EIA specifications, then the notches 391 of latches 390 may not be able to hold the reference connector plugs 350 and 360 inserted into the adapter 310 in place so as to prevent unnecessary power losses. Additionally, connectors plugs may not be in physical contact causing reflections as the optical energy exists the fiber and enters an air gap. Power losses and reflections can limit the performance of the equipment connected by the adapter.

The above description is exemplary of my invention. Numerous modifications and variations may be made by those skilled in the art without departing from the scope and spirit of our invention.

We claim:

1. An apparatus for measuring the length of a fiber optic adapter having two openings and a mechanical reference plane, said apparatus comprising:

a first reference connector plug having a fixed length ferrule and a first lead;

a second reference connector plug having a fixed length ferrule and a second lead;

an ohmmeter coupled to the first and second leads of said first and second connector plugs so as to a form an electrical circuit wherein said ohmmeter is used to measure the resistance of the circuit; and wherein each of said reference connector plug fixed ferrules is inserted into the adapter openings to form a connector plug-adapter assembly and the resistance measured on said ohmmeter is an indication of the length of the adapter.

2. An apparatus in accordance with claim 1 wherein a large resistance ohmmeter measurement indicates that the distance from the mechanical reference plane of the adapter to the center of the adapter is just slightly greater than an industry standard.

3. An apparatus in accordance with claim 1 wherein a small resistance ohmmeter measurement indicates that the distance from the mechanical reference plane of the adapter to the center of the adapter is just slightly less than the industry standard.

4. A method for determining the length of a fiber optic adapter having a first opening and a second opening, said method comprising the steps of:

inserting a first calibrated reference connector having a reference mechanical plane and a ferrule tip into the first opening of the adapter;

inserting a second calibrated reference connector having a reference mechanical plane and a ferrule tip into the second opening of the adapter to form a connector assembly;

measuring the resistance across the connector assembly; and determining from said measured resistance, the adapter length.

5. The method in accordance with claim 4 wherein said determining step further comprises the step of determining from said measured resistance whether the adapter is longer than industry specifications.

6. The method in accordance with claim 4 wherein said determining step further comprises the step of determining from said measured resistance whether the adapter is shorter than industry specifications.

7. The method in accordance with claim 4 wherein said first and second calibration reference connectors each define a first reference length from the respective reference mechanical plane to the respective ferrule tip, said method further comprising repeating said steps of inserting and measuring with third and fourth calibration reference connectors each having a reference mechanical plane and a ferrule tip and each defining a second reference length from the respective reference mechanical plane to the respective ferrule tip, one of said first and second reference lengths being just slightly greater than a rated length of the fiber optic adapter and the other of said first and second reference lengths being just slightly less than the rated length of the fiber optic adapter.

8. A method for determining the intermateability of a connector plug having a ferrule and an adapter having first and second openings, said method comprising the steps of:

measuring the force exerted on a gauge pin in contact with the ferrule of the connector plug as the gauge pin moves the ferrule to prespecified fixed distances;

inserting first and second calibration reference connector plugs each having a reference mechanical plane and a fixed length ferrule, each ferrule having a tip, into the first and second openings of the adapter;

measuring the resistance across the ferrules of the reference plugs inserted in the adapter; and responsive to the resistance measurement and force measurement, determining the intermateability of the connector plug with the adapter.

9. The method in accordance with claim 8 wherein said intermateability determination step includes the substeps of comparing said measured force for each prespecified fixed distance against industry standards.

10. The method in accordance with claim 9 wherein said first and second calibration reference connector plugs each define a first reference length from the respective reference mechanical plane to the respective tip of the respective ferrule, the method further comprising repeating said resistance measuring step with third and fourth calibration reference connectors each having a reference mechanical plane and fixed length ferrules having tips, each third and fourth calibration reference connector defining a second reference length from the respective reference mechanical plane to the respective ferrule tip when inserted in the adapter, one of said first and second reference lengths being just slightly greater than a rated length of the fiber optic adapter and the other of said first and second reference lengths being just slightly less than the rated length of the fiber optic adapter.

11. The method in accordance with claim 10 wherein said force comparison substep indicates that said force measurements are within industry specifications, and wherein said intermateability determination step further includes the steps of:

determining if said first reference length is longer than industry specifications; and determining if said second reference length is shorter than industry specifications.

\* \* \* \* \*